United States Patent [19]

Chan et al.

[11] Patent Number: 5,306,954
[45] Date of Patent: Apr. 26, 1994

[54] CHARGE PUMP WITH SYMMETRICAL +V AND −V OUTPUTS

[75] Inventors: Paul S. Chan, Cupertino; Raymond W. B. Chow, Saratoga, both of Calif.

[73] Assignee: Sipex Corporation, Billerica, Mass.

[21] Appl. No.: 893,519

[22] Filed: Jun. 4, 1992

[51] Int. Cl.⁵ .......................................... H02M 3/18
[52] U.S. Cl. .................................... 307/110; 363/60
[58] Field of Search ........................ 307/108–110, 307/115, 125; 320/1; 361/245, 246; 363/59, 60, 63; H02M 7/25

[56] References Cited

U.S. PATENT DOCUMENTS

| | | | |
|---|---|---|---|
| 3,470,443 | 9/1969 | Berry et al. | 321/2 |
| 3,731,112 | 5/1973 | Smith | 307/109 |
| 3,878,450 | 4/1975 | Greatbatch | 321/15 |
| 3,942,047 | 3/1976 | Buchanan | 307/297 |
| 3,943,428 | 3/1976 | Whidden | 321/15 |
| 3,955,353 | 5/1976 | Astle | 58/23 BA |
| 3,975,671 | 8/1976 | Stoll | 321/15 |
| 4,047,091 | 9/1977 | Hutchines et al. | 363/59 |
| 4,061,929 | 12/1977 | Asano | 307/246 |
| 4,068,295 | 1/1978 | Portmann | 363/60 |
| 4,106,086 | 8/1978 | Holbrook et al. | 363/60 |
| 4,186,436 | 1/1980 | Ishiwatari | 363/60 |
| 4,321,661 | 3/1982 | Sano | 363/60 |
| 4,460,952 | 7/1984 | Risinger | 363/61 |
| 4,485,433 | 11/1984 | Topich | 363/60 |
| 4,527,277 | 7/1985 | Kosaka et al. | 375/82 |
| 4,547,682 | 10/1985 | Bialas, Jr. et al. | 307/297 |
| 4,596,963 | 6/1986 | Lawton et al. | 331/14 |
| 4,636,930 | 1/1987 | Bingham et al. | 363/60 |
| 4,679,134 | 7/1987 | Bingham et al. | 363/61 |
| 4,736,167 | 4/1988 | Kojima et al. | 331/17 |
| 4,745,372 | 5/1988 | Miwa | 331/8 |
| 4,750,193 | 6/1988 | Bailey | 375/81 |
| 4,766,397 | 8/1988 | Adams | 331/1 A |
| 4,777,577 | 10/1988 | Bingham et al. | 363/60 |
| 4,797,899 | 1/1989 | Fuller et al. | 375/7 |
| 4,809,152 | 2/1989 | Bingham et al. | 363/60 |
| 4,829,391 | 5/1989 | Vargas, Jr. | 360/51 |
| 4,871,979 | 10/1989 | Shearer et al. | 330/253 |
| 4,897,774 | 1/1990 | Bingham et al. | 363/61 |
| 4,914,695 | 4/1990 | Martin | 380/7 |
| 4,922,141 | 5/1990 | Lofgren et al. | 307/595 |
| 4,970,472 | 11/1990 | Kennedy et al. | 331/8 |
| 4,970,475 | 11/1990 | Gillig | 331/25 |
| 4,999,761 | 3/1991 | Bingham et al. | 363/60 |
| 5,003,197 | 3/1991 | Nojima et al. | 307/296.2 |
| 5,008,629 | 4/1991 | Ohba et al. | 328/14 |
| 5,043,686 | 8/1991 | Plunkett | 333/181 |
| 5,237,209 | 8/1993 | Brewer | 307/110 |

OTHER PUBLICATIONS

Wakeman, Larry, "National's Process Enhancements Eliminate the CMOS SCR Latch-Up Problem in 56HC/74HC Logic," *National Semiconductor Application Note 339*, pp. 2–43 through 2–50, undated.

*Primary Examiner*—Jeffrey A. Gaffin
*Assistant Examiner*—Richard T. Elms
*Attorney, Agent, or Firm*—Weingarten, Schurgin, Gagnebin & Hayes

[57] ABSTRACT

Charge pump circuitry is implemented using a voltage shifting technique to generate a symmetrical bipolar voltage. The symmetrical bipolar voltage charge pump power supply can be fabricated as an integrated circuit on a single substrate, and can be integrated with various interface circuits to provide symmetrical bipolar voltage thereto. The charge pump includes voltage shifting circuitry which generates an increased output voltage of a negative polarity and an increased output voltage of a positive polarity. The shifting circuitry is responsive to an internal oscillator which triggers charge accumulation and voltage shifting. Neither output voltage is generated from the other output voltage. Rather, the negative and positive supply voltages are each generated, in substantially the same manner, by charge transfer effected by the voltage shifting circuitry in response to triggering by the internal oscillator. Additional circuitry can be fabricated on a single substrate in combination with the presently disclosed charge pump to effect the optimum utilization of circuit board area while minimizing power consumption.

25 Claims, 4 Drawing Sheets

CHARGE PUMP WITH SYMMETRICAL +V AND −V OUTPUTS

FIELD OF THE INVENTION

The present invention relates to charge pump circuits, and in particular to circuitry for converting a unipolar supply voltage to a bipolar voltage of greater magnitude.

BACKGROUND OF THE INVENTION

Integrated circuits are known which contain inverting/non-inverting voltage doubler charge pump circuitry for converting a unipolar supply voltage to a bipolar supply voltage of greater magnitude. Typically, the charge pump circuitry is fabricated on a single chip that receives the unipolar supply voltage (e.g. +5 v) and doubles it. The doubled voltage is then inverted, resulting in the bipolar voltage of increased magnitude (e.g. +/−10 v), which is used as a bipolar supply for on-chip circuitry, such as RS232 receivers and transmitters.

U.S. Pat. Nos. 4,679,134; 4,777,577; 4,797,899; 4,809,152; 4,897,774; 4,636,930 and 4,999,761 illustrate various implementations of such circuitry. The devices disclosed and claimed therein include switches which act during a first phase to direct a source voltage (unipolar) to a first capacitor. The first capacitor charges to the unipolar source voltage. During a second phase, switches act to place the source voltage in series with the voltage stored on the first capacitor to create a source of positive voltage which is approximately two times the unipolar source voltage. A reservoir capacitor is charged to the doubled positive voltage. The doubled positive voltage is stored on a transfer capacitor and subsequently transferred to a reservoir capacitor. Inversion of the doubled positive source voltage is then provided to generate the negative doubled portion of the bipolar voltage. Thus, in the referenced prior art, the doubled positive voltage is generated first and the inverted (i.e. negative) voltage is generated from the doubled positive voltage.

Use of the positive voltage to generate the negative voltage in charge pump circuits known in the prior art is disadvantageous with respect to the asymmetrical loading characteristic of the respective outputs. As illustrated in FIG. 1, in the prior art, given similar loading the negative voltage output is lower than the positive voltage output, i.e., the positive and negative voltage signals are asymmetrical with respect to their common reference. For instance, in the simulation of the prior art which is illustrated, a unipolar +5 V source is provided to a charge pump with a voltage doubler and inverter. The conventional voltage doubler and inverter doubles the source voltage to provide a doubled positive voltage and the negative voltage is generated by inverting the positive doubled voltage. While the prior art charge pump circuitry results in a doubled positive voltage C, averaging +9.15 volts under a 3 K ohm resistive load, the negative portion D generated by inverting the positive voltage averages −8.67 volts, under the same load.

The asymmetry of the doubled positive and inverted voltages negatively affects operational tolerance of circuitry constituting a load to the charge pump.

SUMMARY OF THE INVENTION

A charge pump is presently disclosed which implements a novel voltage shift technique to generate a bipolar voltage having balanced or symmetrical drive capability.

In one embodiment, a charge pump power supply is integrated into a single piece of semiconductor substrate material, and can be integrated with various interface circuits to provide a symmetrical bipolar voltage thereto. The shifting circuitry is responsive to an internal oscillator which triggers charge accumulation and voltage shifting. Unlike the prior art charge pumps referenced hereinabove, the negative bipolar output voltage is not generated from the positive bipolar output voltage. Rather, the negative and positive bipolar output voltages are each generated, in substantially the same manner, via the symmetrical charge transfer technique herein described.

Features of the invention include provision of symmetrical +V and −V output voltages under balanced load conditions. The charge pump can also be integrated with various other circuits including interface circuits in conformance with RS232, RS422, RS485 and other standards, or any other functional circuitry as desired.

DESCRIPTION OF THE DRAWING

Other features and benefits of the invention will be more clearly understood with reference to the specification and the accompanying drawings in which.

DETAILED DESCRIPTION

Figure 1:
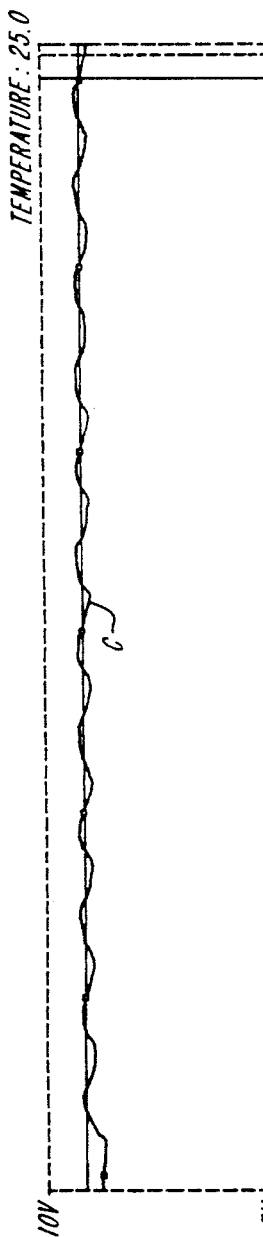
FIG. 1 is a plot of circuit simulation outputs for a charge pump with a voltage doubler and voltage inverter according to the prior art.
Figure 1:
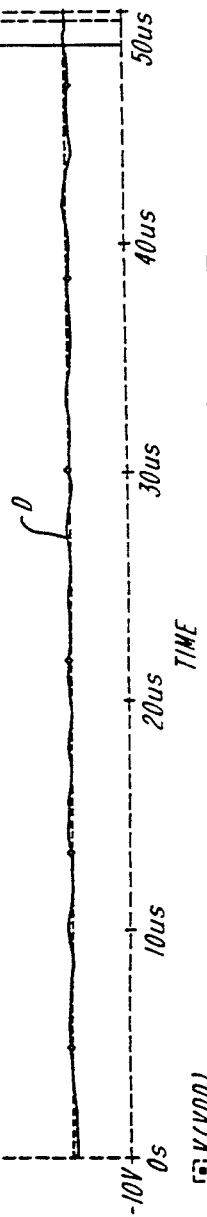
Figure 2:
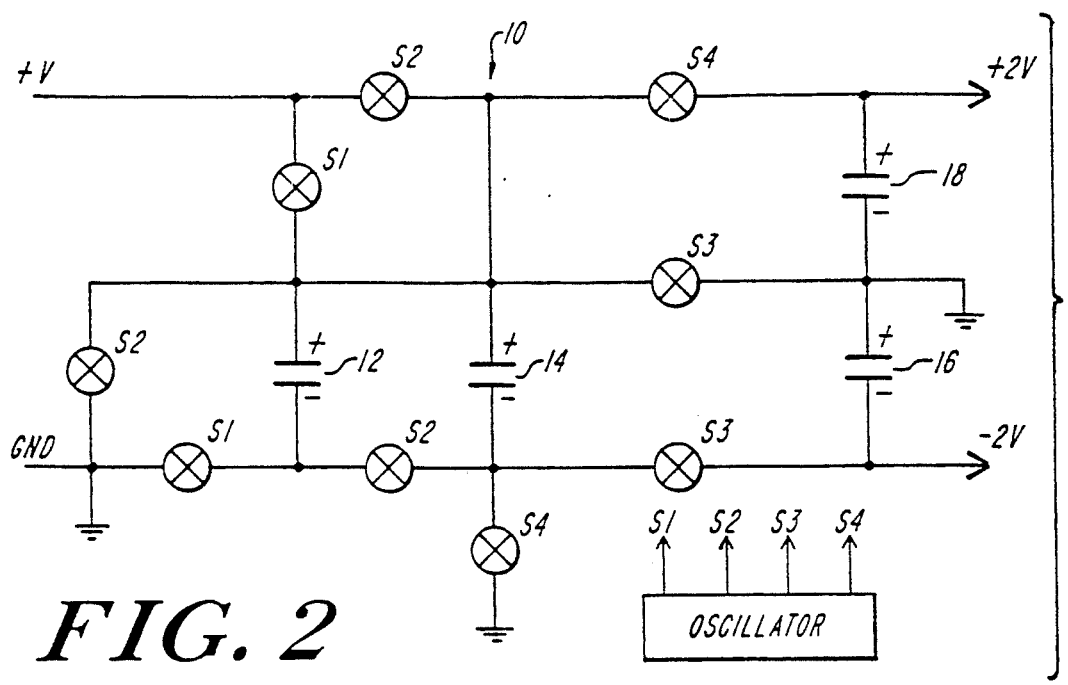
FIG. 2 is a general schematic diagram of a charge pump circuit for generating symmetrical +V and −V output voltages.
Figure 3:
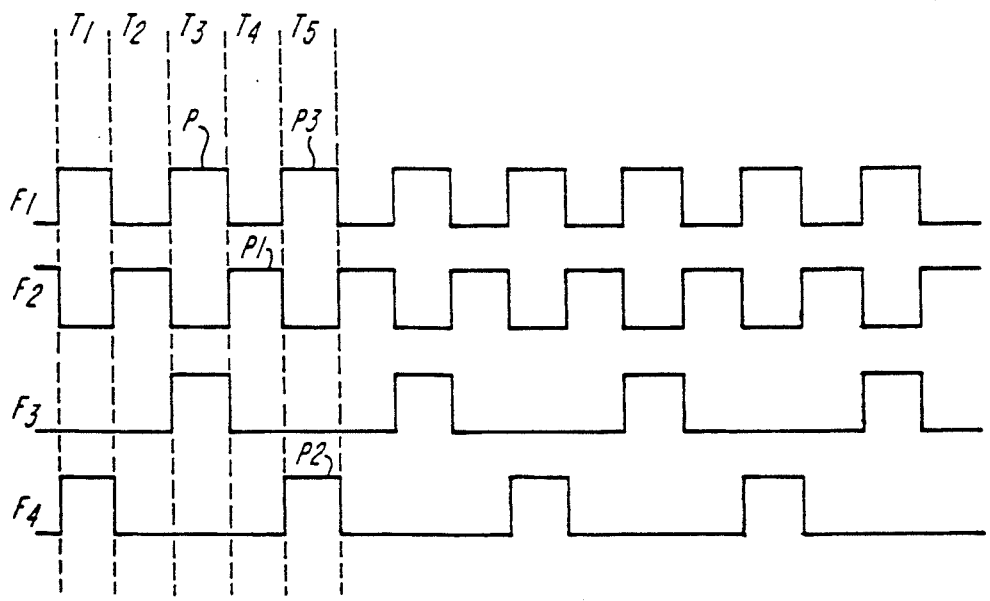
FIG. 3 is a timing diagram of oscillator signals providing the timing sequence for the charge pump circuit of FIG. 2, for generating symmetrical +V and −V output voltages.

A charge pump circuit implementing a symmetrical voltage shifting technique is generally illustrated in FIG. 2. The circuit 10 is triggered by an oscillator (not shown) which generates a timing sequence, illustrated in FIG. 3. A plurality of switches, working in conjunction and represented functionally as S1, S2, S3, and S4, are triggered by the timing sequence as described hereinafter. Though shown schematically for simplicity in FIG. 2, it should be understood that the switches comprise semiconductor switches.

During a first time interval T1, switches indicated as S1 are closed so as to be in a conductive state in response to a first frequency F1, causing a first transfer capacitor 12 to be charged to approximately the source voltage +V. During a second time interval T2, switches S1 are opened so as to be in a non-conductive state and switches S2 are closed in response to a second frequency F2, causing the positive (+) side of the charged first transfer capacitor 12 to be shifted from +V and connected to ground, effectively changing the reference of the voltage on the positive side of the first capacitor 12. Closing the switches S2 during the second time interval T2 also connects a second capacitor 14 between the +V voltage source and the negative side of the transfer capacitor 12, thereby causing the capacitor 14 to be charged to a magnitude of twice the +V voltage, and to be biased between +V and −V respectively at the positive and negative ends thereof. During a third time interval T3, switches S3 are closed in response to a third frequency F3. While the first transfer capacitor 12 is again charged during a pulse P according to the first frequency F1, the bias of the second capacitor 14 undergoes a negative voltage shift such that the capacitor 14 is interconnected in the circuit with the positive side of the capacitor 14 switchably connected to ground and the negative side of the capacitor 14 switchably connected to the negative side of a first storage capacitor 16, to provide the negative portion, −2 V, of the bipolar output voltage.

The pulse P, illustrated in F1, causes the first capacitor 12 to become charged to the supply voltage (+V) during the time interval T3. A pulse P1, illustrated in F2, causes the switches S2 to close, causing the positive (+) side of the charged first capacitor 12 to be shifted from +V and connected to ground, effectively changing the reference of the voltage on the positive side of the first capacitor 12. Also during the same time interval, the second capacitor 14 is switchably connected between the +V voltage source and the negative (−) side of the transfer capacitor 12, thereby causing the capacitor 14 to be charged to a magnitude of approximately twice the +V voltage, with the (+) and (−) ends thereof being biased substantially symmetrically around the ground reference.

During a fifth time interval T5, a pulse P2 illustrated in F4 causes the switches S4 to close, while switches S3 are open, connecting the negative end (−V) of the capacitor 14 to ground and connecting the positive end (+V) of the capacitor 14 to the positive side of a storage capacitor 18. The voltage across the capacitor 14 is shifted and switchably connected in parallel with the storage capacitor 18, to provide the positive portion, +2 V, of the bipolar voltage of increased magnitude.

During the time interval T5, a pulse P3 illustrated in F1 causes another charge to be developed on the first capacitor 12 which is used as described hereinabove, in subsequent time intervals to provide the negative portion, −2 V, of the bipolar voltage of increased magnitude. The charge transfer effected by the voltage shifting circuitry in response to triggering by the internal oscillator thus provides a negative portion of the bipolar voltage of increased magnitude that is not generated by inversion of the positive portion. The charge transfer and voltage shifting as described above, is continued repetitively resulting in the symmetrical −V and +V charge pump outputs.

Figure 4:
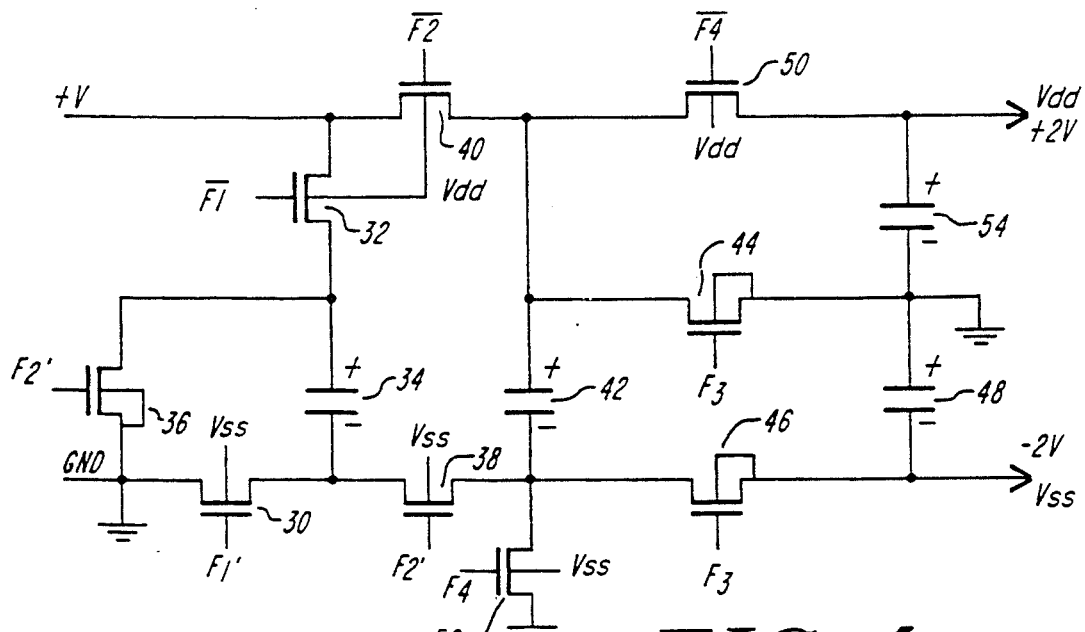
FIG. 4 is a schematic diagram providing greater detail of the charge pump circuit of FIG. 2 for generating symmetrical +V and −V output voltages.
Figure 5:
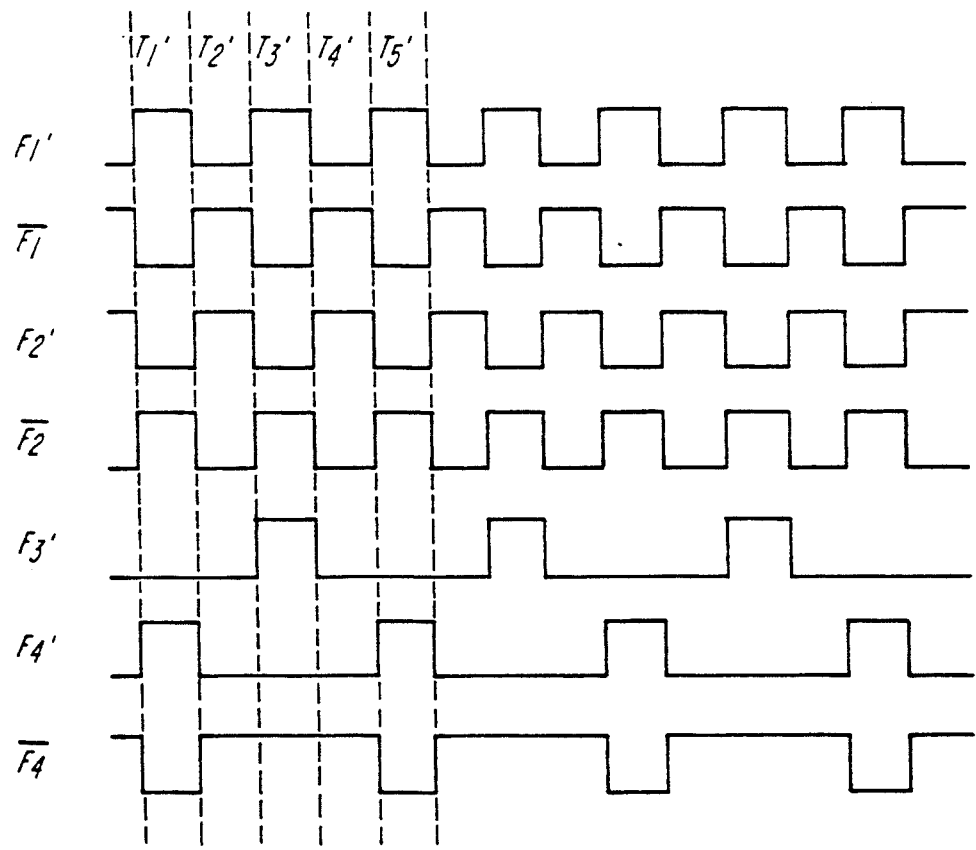
FIG. 5 is a timing diagram of oscillator signals providing the timing sequence for the charge pump circuit of FIG. 4, for generating symmetrical +V and −V output voltages.

An illustrative embodiment of the present invention is shown in greater detail in FIGS. 4 and 5. The various switches, formerly represented generally as S1, S2, S3 and S4, are implemented using N and P channel metal oxide semiconductor (MOS) field effect transistors, (FETs), as shown in FIG. 4.

The timing diagram of FIG. 5 illustrates the various frequencies of the oscillator employed to cause charge transfer and voltage shifting which result in the symmetrical −V and +V charge pump outputs, according to this illustrative embodiment. The oscillator can be fabricated via any technique well known in the art and employs oscillation circuitry generally known in the art. The circuit illustrated in FIG. 4 receives a unipolar supply input voltage +V. The circuit includes P channel and N channel field effect transistors (FETs), which perform the switching functions, substantially as described hereinabove and as illustrated in FIG. 5. While FETs are depicted, it is understood that any semiconductor switches can be employed with appropriate modifications to provide for proper biasing and activation of such switches.

A first frequency F1', is received at the gate of a first N channel FET 30 which is configured as a switch that is conductive when its gate is taken high. An inverse signal $\overline{F1}$, is received at the gate of a first P channel FET 32 configured as a switch that is conductive when its gate is taken low. During a first time interval T1', F1 is active (high) putting the first N channel FET 30 in a conductive state, while $\overline{F1}$, an active low signal puts the first P channel FET 32 in a conductive state, connecting a first transfer capacitor 34 across the unipolar input supply voltage +V and charging transfer capacitor 34 to +V during the time interval T1'. During a second time interval, T2', F1' and $\overline{F1}$ are both inactive and F2' and $\overline{F2}$ are received by second and third N channel FETs 36, 38 and second P channel FET 40, respectively. With FET switches 30 and 32 in a non-conductive state, and with FET switches 36, 38 and 40 in a conductive state in accordance with their respective gating signals F2' and $\overline{F2}$, the positive side of the charged capacitor 34 is shifted from +V and connected to ground through the active FET 36, effectively changing the reference of the voltage on the positive side of the transfer capacitor 34. A second capacitor 42 is connected, via conducting FET switches 38 and 40 during the time interval T2', between the +V voltage source and the negative side of the first capacitor 34 causing the capacitor 42 to be charged to a magnitude of approximately twice the +V voltage and to be biased between +V and −V at the positive and negative ends respectively, substantially symmetrically around the ground reference. During a third time interval T3', a third frequency F3' causes a pair of n-channel FET switches 44, 46 to become electrically conductive to change the reference of the voltage across capacitor 42. A negative voltage shift is thereby effected, wherein the positive side of capacitor 42 is switchably connected to ground and to the positive side of a reservoir capacitor 48 and the negative side of capacitor 42 is switchably connected to the negative side of the reservoir capacitor 48, to charge the negative storage capacitor 48 and to provide the negative portion, −2 V, of the bipolar output voltage.

Also during time interval T3', frequencies F1' and $\overline{F1}$ are active to again cause FET switches 30 and 32 to become conductive, resulting in the charging of capacitor 34 to +V. During a fourth time interval, T4' frequencies F2' and $\overline{F2}$ are active causing FET switches 36, 38 and 40 to become conductive and to electrically connect the positive side of charged capacitor 34 to ground, changing the reference thereof, and to connect the negative side of capacitor 42 to the negative side of capacitor 34 while the positive side of capacitor 42 is connected to the input voltage +V. The resultant connection of the capacitor 42 between the +V voltage source and the negative side of capacitor 34 results in the capacitor 42 being charged to a magnitude of approximately twice the +V input voltage, and symmetrically biased around the ground reference with a +V voltage at the positive end of capacitor 42 and a −V voltage at the negative end of the capacitor 42.

When frequencies F4 and F4' are active during a fifth time interval T5', FETs 50 and 52 become conductive, while FETs 44 and 46 become non-conductive, electrically connecting the negative end of capacitor 42 to ground and the positive end of capacitor 42 to the positive side of a second storage capacitor 54. The voltage of approximately twice the +V input voltage source which was biased between +V and −V across the capacitor 42 is thus shifted across the positive storage capacitor 54, so as to charge the storage capacitor 54 and provide the positive portion, +2 V, of the bipolar output voltage.

The frequencies F1' and F1, connected to the gates of FETs 30 and 32 and active during the time interval T5', cause another charge to be developed on the capacitor 34, which is used in subsequent time intervals to provide the negative portion, −2 V, of the bipolar output voltage.

Figure 6:
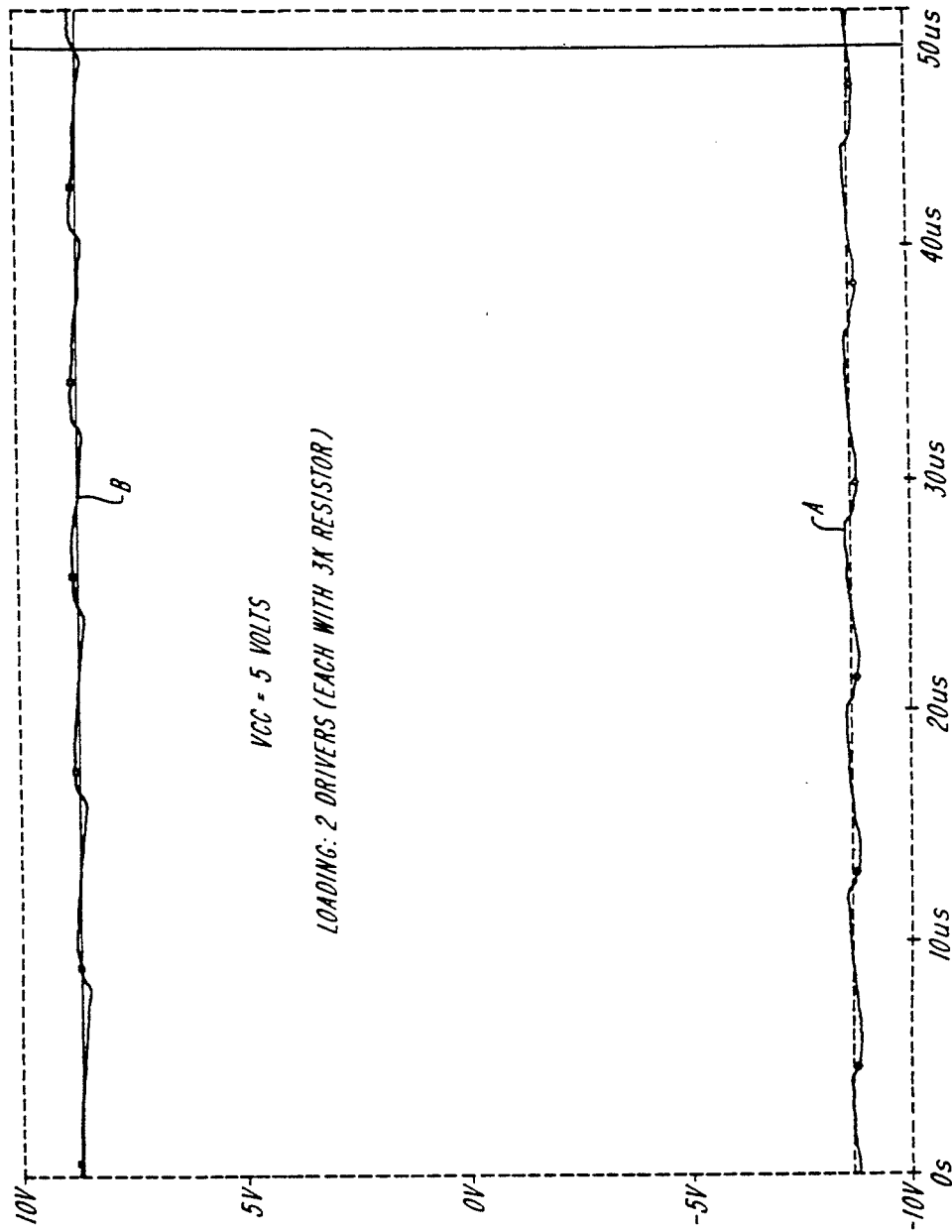
FIG. 6 is a plot of circuit simulation outputs for a charge pump according to FIGS. 2, 3, 4 and 5 generating symmetrical +V and −V output voltages.

The repetitive charge transfer and voltage shifting in response to the various frequencies of the interval oscillator results in a symmetrical +V and −V bipolar output voltage as illustrated in FIG. 6, in response to balanced loading. The unipolar +5 V input voltage provided to the charge transfer and voltage shifting circuitry described hereinbefore, results in a negative portion (A) of the bipolar voltage which averages approximately −8.69 volts with an applied 3 K ohm resistive load. The positive portion (B) of the bipolar voltage generated by charge transfer and voltage shifting, averages +8.69 volts when driving a 3 K ohm resistive load. The symmetry of the bipolar output voltages is thus significantly greater than is obtainable via the charge pump circuitry employing voltage doublers and inverters known in the art.

The circuitry described hereinbefore can be implemented in a monolithic silicon substrate using CMOS fabrication techniques to implement the charge pump having symmetrical −V and +V output voltages to supply RS232 transmitters and/or receivers fabricated in the same substrate. Additionally, the charge pump can be integrated with various other circuits including interface circuits in conformance with RS422, RS485 and other standards, as well as circuitry performing other functions such as analog to a digital conversion.

While an illustrative embodiment is disclosed hereinabove which employs FET switches to cause desired connections, it will be appreciated that other semiconductor switching means can be used in practicing the invention.

Although the illustrative embodiments described hereinabove implement a voltage shifting technique wherein the negative output voltage of increased magnitude is generated first via voltage shifting and the positive output voltage of increased magnitude is generated subsequently, it is appreciated that the switching and voltage shifting technique can be implemented so that the positive voltage is generated first with the negative voltage generated subsequently, while still employing the disclosed shifting technique.

Although the invention has been shown and described with respect to exemplary embodiments thereof, various other changes, omissions and additions in form and detail thereof may be made therein without departing from the spirit and scope of the invention.

What is claimed is:

1. A method for generating, from a first voltage source providing a unipolar input voltage of first polarity having a voltage reference connection, bipolar output voltages of magnitude approximately twice the unipolar input voltage comprising the steps of:

charging a first charge transfer device having first and second connection ends to a voltage approximating said unipolar input voltage by switchably connecting said second connection end of said first charge transfer device to said unipolar input voltage and said first connection end of said first charge transfer device to said voltage reference connection;

in a first generating step, generating a second voltage source at the first connection end of said first charge transfer device, with respect to said voltage reference connection, of magnitude substantially equal to the magnitude of said unipolar input voltage but of opposite polarity by switchably connecting said second end of said first charge transfer device to said voltage reference connection;

charging a second charge transfer device having first and second connection ends by switchably connecting said second connection end of said second charge transfer device to said unipolar input voltage and said first connection end of said second charge transfer device to said second voltage source;

in a second generating step, generating a third voltage source of magnitude approximately equal to twice the magnitude of said unipolar input voltage and of a selected polarity by switchably connecting one of said first and second connection ends of said second charge transfer device to said voltage reference connection;

in a third generating step, generating a fourth voltage source of magnitude approximately equal to twice the magnitude of said unipolar input voltage and of a polarity opposite to said selected polarity by switchably connecting the other of said first and second connection ends referenced in said second generating step to said voltage reference connection.

2. The method of claim 1 further including between said second and third generating steps a step of recharging said second charge transfer device between said unipolar input voltage and said second voltage source.

3. The method of claim 2 wherein said first charge transfer device is a capacitor.

4. The method of claim 3 wherein said second charge transfer device is a capacitor.

5. The method of claim 1 wherein said second generating step includes a step of transferring charge from said second charge transfer device to a first charge storage device and said third generating step includes the step of transferring charge from said second charge transfer device to a second charge storage device.

6. The method of claim 5 wherein said third and fourth charge storage devices are capacitors.

7. The method of claim 5 wherein the steps of charging a first charge transfer device, generating a second voltage source, charging a second charge transfer device, generating a third voltage source and generating a fourth voltage source are performed repetitively.

8. The method of claim 1 wherein said unipolar input voltage is of a positive polarity with respect to said voltage reference connection, said third voltage source has a negative polarity with respect to said voltage reference connection, and said fourth voltage source has a positive polarity with respect to said voltage reference connection.

9. The method of claim 1 wherein said unipolar input voltage is of a positive polarity with respect to said voltage reference connection, said third voltage source has a positive polarity with respect to said voltage reference connection, and said fourth voltage source has a negative polarity with respect to said voltage reference connection.

10. A method for generating, from a first voltage source providing a unipolar input voltage of first polarity having a voltage reference connection, bipolar output voltages of magnitude approximately twice the unipolar input voltage comprising the steps of:
in a first reconfiguring step, switchably connecting a first capacitor having first and second connection ends such that the second connection end is electrically connected to the unipolar input voltage and the first connection end is electrically connected to the voltage reference connection to charge the first capacitor to a voltage approximating the unipolar input voltage;
in a second reconfiguring step, switchably reconfiguring the first capacitor to generate a second voltage source at the first connection end of the first capacitor of magnitude substantially equal to the unipolar input voltage with respect to the voltage reference connection but of a second polarity opposite to the first polarity;
in a third reconfiguring step, switchably connecting a second capacitor having first and second connection ends between the unipolar input voltage source of first polarity and the second voltage source of second polarity;
in a fourth reconfiguring step, switchably reconfiguring the second capacitor to generate a third voltage source with respect to the voltage reference connection having a magnitude approximately twice the magnitude of the unipolar input voltage and having a selected polarity; and
in a fifth reconfiguring step, switchably reconfiguring the second capacitor to generate a fourth voltage source with respect to the voltage reference connection having a magnitude approximately twice the magnitude of the unipolar input voltage of polarity opposite to the selected polarity of the third voltage source.

11. The method of claim 10 further including between the fourth and fifth reconfiguring steps, the step of recharging the second capacitor between the unipolar input voltage of first polarity and the second voltage source of second polarity.

12. The method of claim 11 wherein the second reconfiguring step includes the step of switchably disconnecting the first connection end of the first capacitor from the voltage reference connection and switchably connecting the second connection end of the first capacitor to the voltage reference connection.

13. The method of claim 10 wherein the third reconfiguring step includes the step of switchably connecting the first end of the second capacitor to the second voltage source and switchably connecting the second end of the second capacitor to the unipolar input voltage.

14. A method for generating a bipolar output voltage from a unipolar input supply voltage having a voltage reference, said method comprising the steps of:
charging a first charge transfer device to a first voltage approximately equal to said unipolar input supply voltage;
inverting said first voltage to provide a second voltage of a magnitude approximately equal to and a polarity opposite to said first voltage and providing a third voltage between said unipolar input supply voltage and said second voltage;
transferring said third voltage to a first charge storage device of a selected polarity; and
transferring said third voltage to a second charge storage device of polarity opposite to said selected polarity.

15. The method of claim 14 further including the step of storing said third voltage on a second charge transfer device and alternately connecting said second charge transfer device in parallel with each of said first and second charge storage devices to effect the transfer of said third voltage in said transferring steps.

16. The method of claim 14 wherein said selected polarity is negative with respect to said voltage reference.

17. The method of claim 15 further including a step of recharging said second charge transfer device after transferring said third voltage to said first charge storage device and prior to transferring said third voltage to said second charge storage device.

18. An apparatus for generating a bipolar output voltage from a first voltage prov a unipolar input supply voltage having a voltage reference, comprising:
at least two first switching devices operative upon activation to charge a first charge transfer storage device to a first voltage approximately equal to said unipolar input supply voltage;
at least two second switching devices operative upon activation to invert said first voltage to provide a second voltage of a magnitude approximately equal to and a polarity opposite to said first voltage and to couple said second voltage and said unipolar input supply voltage to provide a third voltage between said unipolar input supply voltage and said second voltage;
at least two third switching devices operative upon activation to transfer said third voltage to a first charge storage device of a selected polarity; and
at least two fourth switching devices operative upon activation to transfer said third voltage to a second charge storage device of polarity opposite said selected polarity.

19. The apparatus of claim 18 further including an oscillator for generating a plurality of signals to activate said first, second, third and fourth switching devices.

20. The apparatus of claim 18 further including a second charge transfer device for storing said third voltage prior to transferring said third voltage.

21. The apparatus of claim 18 wherein said selected polarity is negative with respect to said voltage reference.

22. The apparatus of claim 20 wherein said second charge storage transfer device is recharged after transferring said third voltage to said first charge storage device and prior to transferring said third voltage to said second charge storage device.

23. The apparatus of claim 18 wherein at least one of said first charge transfer device, said first charge storage device and said second charge storage device is a capacitor.

24. The apparatus of claim 18 wherein at least one of said first, second, third and fourth switching devices is a field effect transistor.

25. The apparatus of claim 24 wherein at least one of said first, second, third, and fourth switching devices is an n-channel metal oxide semiconductor field effect transistor and at least one of said first, second, third, and fourth switching devices is a p-channel metal oxide semiconductor field effect transistor.

* * * * *